US010222978B2

(12) United States Patent
Hillion et al.

(10) Patent No.: US 10,222,978 B2
(45) Date of Patent: Mar. 5, 2019

(54) REDEFINITION OF A VIRTUAL KEYBOARD LAYOUT WITH ADDITIONAL KEYBOARD COMPONENTS BASED ON RECEIVED INPUT

(71) Applicant: INTERNATIONAL BUSINESS MACHINES CORPORATION, Armonk, NY (US)

(72) Inventors: Stephane Hillion, Valbonne (FR); Thierry Kormann, Valbonne (FR); Stephane Jacques-Yves Lizeray, Valbonne (FR); Remi VanKeisbelck, Valbonne (FR)

(73) Assignee: International Business Machines Corporation, Armonk, NY (US)

(*) Notice: Subject to any disclaimer, the term of this patent is extended or adjusted under 35 U.S.C. 154(b) by 412 days.

(21) Appl. No.: 14/792,910

(22) Filed: Jul. 7, 2015

(65) Prior Publication Data
US 2017/0010803 A1  Jan. 12, 2017

(51) Int. Cl.
  *G06F 3/048*  (2013.01)
  *G06F 3/0488*  (2013.01)
  *G06F 3/023*  (2006.01)

(52) U.S. Cl.
  CPC ........ *G06F 3/04886* (2013.01); *G06F 3/0237* (2013.01); *G06F 3/0238* (2013.01)

(58) Field of Classification Search
  None
  See application file for complete search history.

(56) References Cited

U.S. PATENT DOCUMENTS

| | | | | |
|---|---|---|---|---|
| 2008/0104542 | A1* | 5/2008 | Cohen | G06F 17/30864 715/810 |
| 2011/0090151 | A1* | 4/2011 | Huang | G06F 3/0237 345/168 |
| 2013/0104068 | A1* | 4/2013 | Murphy | G06F 3/0237 715/773 |
| 2014/0059417 | A1* | 2/2014 | Bernelas | G06F 17/241 715/230 |
| 2015/0242392 | A1* | 8/2015 | Wisniewski | G06F 3/0227 704/8 |
| 2017/0060413 | A1* | 3/2017 | Singh | G06F 3/0237 |

* cited by examiner

*Primary Examiner* — Andrey Belousov
*Assistant Examiner* — Haimei Jiang
(74) *Attorney, Agent, or Firm* — Richard Wilhelm; Matthew H. Hulihan; Heslin Rothenberg Farley & Mesiti PC

(57) ABSTRACT

A device is provided having a touchscreen, a storage device and a processor connected to the touchscreen and the storage device. The touchscreen is arranged to display a keyboard defined by a keyboard layout and to receive an input on the keyboard. The storage device is arranged to store a specification for a restricted language, and the specification includes a grammar and vocabulary for the restricted language and includes annotations defining additional keyboard components in relation to specific elements within the grammar. The processor is arranged to define the keyboard layout, determine a specific element within the grammar referred to by a received input, and redefine the keyboard layout to include the additional keyboard components defined in the annotation for the determined specific element within the grammar.

12 Claims, 8 Drawing Sheets

REDEFINITION OF A VIRTUAL KEYBOARD LAYOUT WITH ADDITIONAL KEYBOARD COMPONENTS BASED ON RECEIVED INPUT

BACKGROUND

The present invention relates to a method and device for defining a keyboard layout, and in one embodiment, the invention provides for a redefine of a keyboard layout according to annotations in a specification for a restricted language.

SUMMARY

According to one or more aspects of the present invention, a computer implemented method is provided comprising: accessing a specification for a restricted language, the specification comprising grammar and vocabulary for the restricted language and including annotations defining additional keyboard components in relation to specific elements within the grammar; defining a keyboard layout; receiving an input relating to the keyboard layout; determining a specific element within the grammar referred to by the received input; and redefining the keyboard layout to include the additional keyboard components defined in the annotation for the determined specific element within the grammar.

According to another aspect of the present invention, a device is provided comprising: a touchscreen to display a keyboard defined by a keyboard layout and to receive an input on the keyboard; a storage device to store a specification for a restricted language, the specification comprising grammar and vocabulary for the restricted language and including annotations defining additional keyboard components in relation to specific elements within the grammar; and a processor connected to the touchscreen and the storage device and configured to define the keyboard layout, determine a specific element within the grammar referred to by a received input, and redefine the keyboard layout to include the additional keyboard components defined in the annotation for the determined specific element within the grammar.

According to a further aspect of the present invention, provided herein is a computer program product for controlling a processor, the computer program product comprising a computer readable storage medium having program instructions embodied therewith, the program instructions being executable by the processor to cause the processor to access a specification for a restricted language, the specification comprising grammar and vocabulary for the restricted language and including annotations defining additional keyboard components in relation to specific elements within the grammar, define a keyboard layout, receive an input relating to the keyboard layout, determine a specific element within the grammar referred to by the received input, and redefine the keyboard layout to include the additional keyboard components defined in the annotation for the determined specific element within the grammar.

BRIEF DESCRIPTION OF THE DRAWINGS

Embodiments of the present invention are described below, by way of example only, with reference to the drawings, in which.

DETAILED DESCRIPTION

Figure 1:
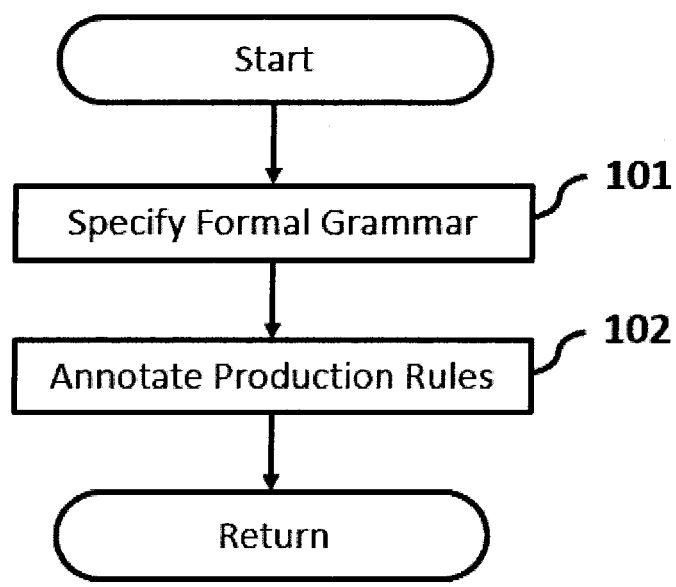
FIG. 1 is a flowchart of one embodiment of a method of defining annotations in a specification, in accordance with one or more aspects of the present invention.

A restricted language is a language that is defined by a specification that restricts the grammar and vocabulary and is essentially a subset of a natural language such as English. Controlled Natural Languages (CNLs) are subsets of natural languages, the subsets being capable of being understood by computer systems by restricting both the grammar and the vocabulary in order to reduce or remove ambiguity and complexity. A domain-specific language (DSL) is a computer language (or often, declared syntaxes or grammars) specialized to a particular application domain. A DSL is created specifically to solve problems in a particular domain. For instance, the domain can be a business area such as billing, salary calculation, or life insurance policies.

Both CNLs and DSLs restrict syntax and semantics of a natural language. Restriction of syntax means that sentences have a particular form, and use only terms from a given vocabulary. Restricting the semantics means that the terms are given a pre-chosen sense which is valid in the considered business domain. For example, conceptual ontological models expressed in an ontological description language may be used to define the pre-established semantics of a medical domain in form of axioms on concepts. In this medical domain, a restricted language may be used by doctors and pharmacists in respect of prescriptions for patients. Only specific terms and semantics are allowed ensuring good communication and fewer errors.

Multi-touch devices (such as modern phones or tablets) are becoming increasingly powerful and popular. The size and speed of these devices has increased over time. However, the size of these portable devices also restricts the size of the touchscreen display that can be used to enter or view text. Typing large amounts of text on such mobile devices can be particularly difficult due to the size or form factor of the device and associated keyboard. The user is often forced to use small keyboards with overloaded keys. This makes the process of inputting text on such devices inefficient and reduces the user satisfaction. In addition, it may lead to typing mistakes and thus more backtracking to correct mistakes.

A device is provided herein that improves the efficiency of text input that must comply with a restricted language such as a controlled natural language (CNL) or a domain specific language (DSL). The device uses a language specification that has annotations added to the grammar constructs of the specification with domain-specific abbreviations. The device uses these annotations to dynamically add domain-specific virtual keys to the virtual keyboard. The device computes the virtual keys depending on the current text input, the current location in this text, and the current grammar construct being used. When the user depresses one of those virtual keys, the long form of the text is inserted into the text buffer.

This device has several advantages over existing systems. By providing a dedicated key on the keyboard, entering a text fragment that must conform to a particular grammar is fast and less error prone. By using domain-specific, business-specific or even company-specific acronyms to define a virtual key, the keyboard being presented to the users remain clear and non-ambiguous. The device dynamically takes into account any modifications done to the text input to adjust the keyboard layout. Having virtual keys on top of or part of the keyboard is something that is commonly used in modern smartphone or tablets. The device also ensures that the keyboard layout remains as stable as possible to avoid the retraining cost of touch-typing.

To facilitate an understanding of the principles of the operation of the device, the principles are described hereinafter with reference to the implementation of the improved keyboard handling as part of domain-specific language for medical prescriptions. However, the practical applications of the improved keyboard handling are not limited to this particular environment, but can find utility in any structured systems using restricted languages such as controlled natural languages, or domain specific languages. A common idea of the embodiments consists in attaching annotations to the grammar constructs (production rules) and the vocabulary of a CNL or a DSL. The annotations may refer to domain-specific abbreviations that are commonly used by domain experts. A good example is "q.p.m." which stands for "every day after noon or every evening" in medical prescriptions.

FIG. 1 illustrates one embodiment of the initial process of how to define annotations. The process begins at step 101 with the specification of the restricted language for use by a domain expert. This step may include the usage of a grammar authoring tool. In any case, in order to generate a grammar, the grammar author illustratively generates a plurality of production rules. Referring to the example of medical prescriptions, such production rules may include, for example:

```
<syntax>    => "Apply" <number> <unit> <options>? ;
<options>   => "once daily" |
            => "four times a day" |
            => "every day after noon or every evening" ;
<unit>      => "mg" | "ml" ;
```

This production rule specifies that should the word "apply" be used then the defined syntax must be followed by a number, a unit (from two defined choices) and an option (from three defined choices).

The second step 102 consists in annotating some or all of the production rules with a property that will help the device when defining new virtual keys. In one embodiment, the annotation may give an opportunity for the domain expert to specify an acronym for a given grammar construct (for example, "AAA" for "Apply to Affected Area"). In another embodiment, the annotation may consist in an abbreviation plus some additional information (for example, using importance criteria). The device may then use the extra information to adjust the keyboard layout (for example, changing the virtual key size, location, or visibility according). The following example shows annotated version of the production rules:

```
<syntax>    => "Apply" <number> <unit> <options>? ;
<options>   => "once daily" {abbreviation("od") ;}|
            => "four times a day" {abbreviation("q.d.s.") ;}|
            => "every day after noon or every evening"
               {abbreviation("q.p.m.") ;};
<unit>      => "mg" {abbreviation("mg") ;}|
            => "ml" {abbreviation("ml") ;};
```

Figure 2:
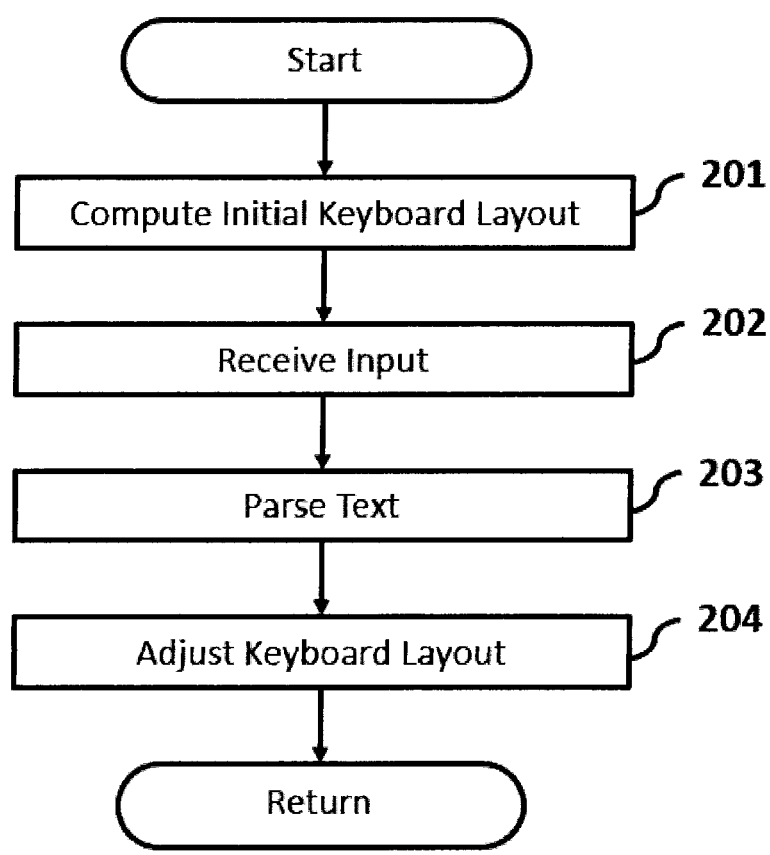
FIG. 2 is a flowchart of one embodiment of a method of customizing a virtual keyboard, in accordance with one or more aspects of the present invention.

Once the grammar has been designed and annotated, the device parses and adjusts the virtual keyboard while the user is inputting text. FIG. 2 shows one embodiment of the overall process of how a virtual keyboard gets customized. Given an input text, the device starts by performing an analysis of the grammar and identifying the production rules allowed at a given location in this text. Then the device collects the said annotations on the identified production rules in order to compute an initial keyboard layout. In one embodiment, the device may choose to propose an initial keyboard layout only based on the grammar and the annotations of the DSL. In another embodiment, the device may decide to slightly modify the device keyboard (e.g.: the QWERTY or the AZERTY layout). More details about how virtual keys are chosen and positioned are provided below.

At the first step 201, the device computes an initial keyboard layout. The next step 202 in the process occurs with the processing device receiving input. The input may be non-textual input, such as, for example, digital ink input, speech input, or other input. With respect to the example described below, it is assumed that the input is text input. At step 203, the device may then recognize the input, parse the resulting text, and identify a new set of production rules. At step 204 once a new set of production rules has been computed, the device may reconfigure the keyboard layout originally used in step 201.

Figure 3:
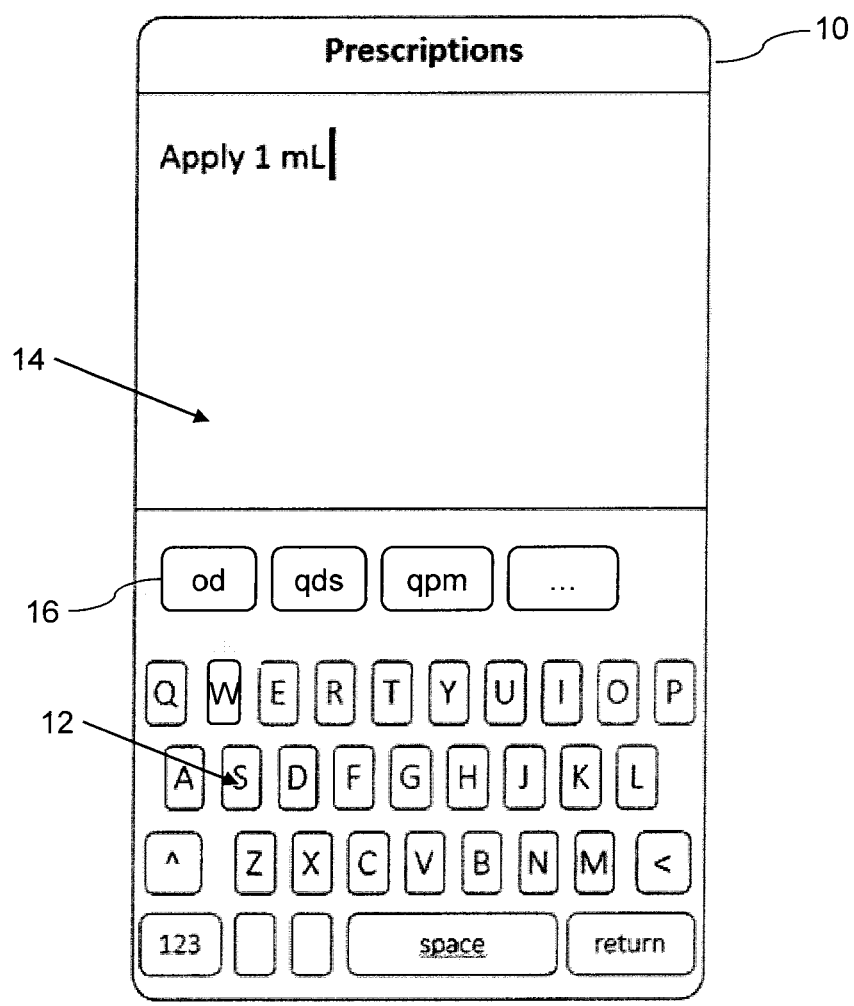
FIGS. 3 and 4 are schematic diagrams of one embodiment of a device that includes a touchscreen, in accordance with one or more aspects of the present invention.

FIG. 3 shows a smartphone 10 with a standard QWERTY keyboard 12 displayed on a touchscreen 14 enriched by the device with virtual keys 16 using the medical prescriptions example. The labels of the keys correspond to the abbreviations specified on the grammar construct through the annotation mentioned above. The user has "Apply 1 ml . . . " using the touchscreen 14 and as a result, the additional keys 16 have been provided as additional keyboard components as defined by the annotations to the specific element within the grammar (the "apply" semantic shown above).

Figure 4:
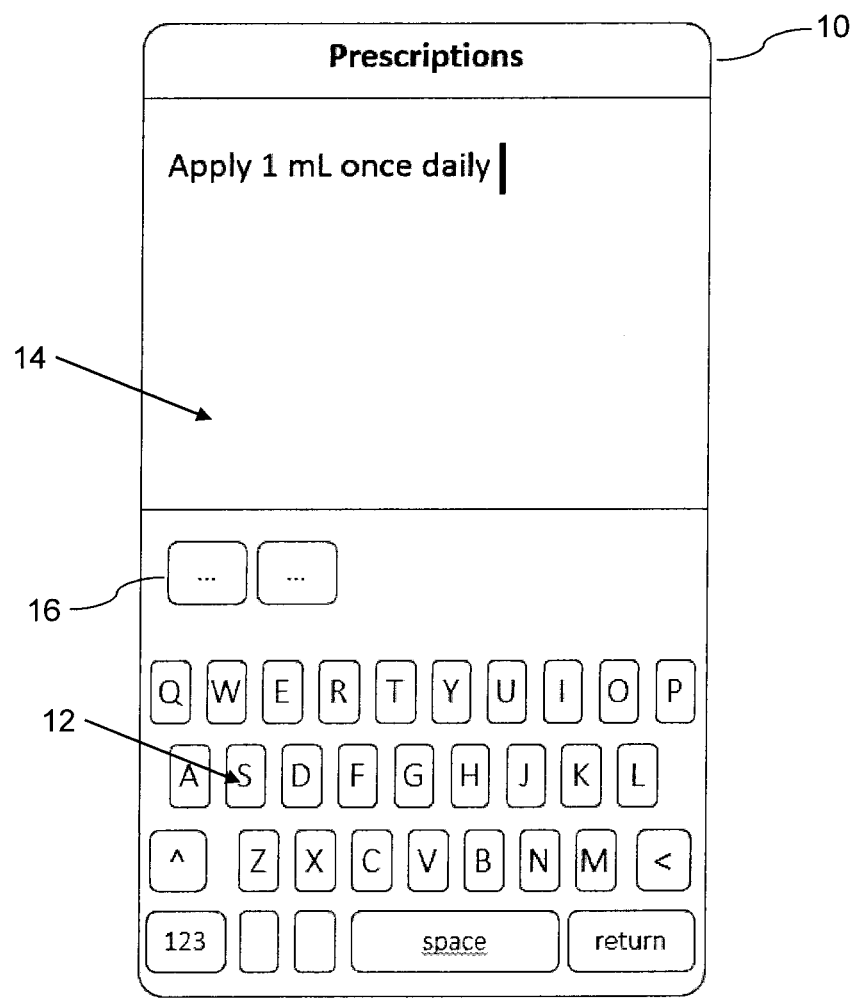

FIG. 4 shows an updated version of a smartphone standard QWERTY keyboard once the virtual key "od" has been pressed and the text input has been modified. The abbreviation was used for the specific key that was shown to the user, but once the user "presses" that virtual key then the device 10 adds the full element "once daily" from the grammar to the displayed text. Here, an annotation defines an additional keyboard component as an abbreviation for an element in the vocabulary and when an input is received selecting the abbreviation the full element in the vocabulary to which the abbreviation relates is displayed.

Figure 5:
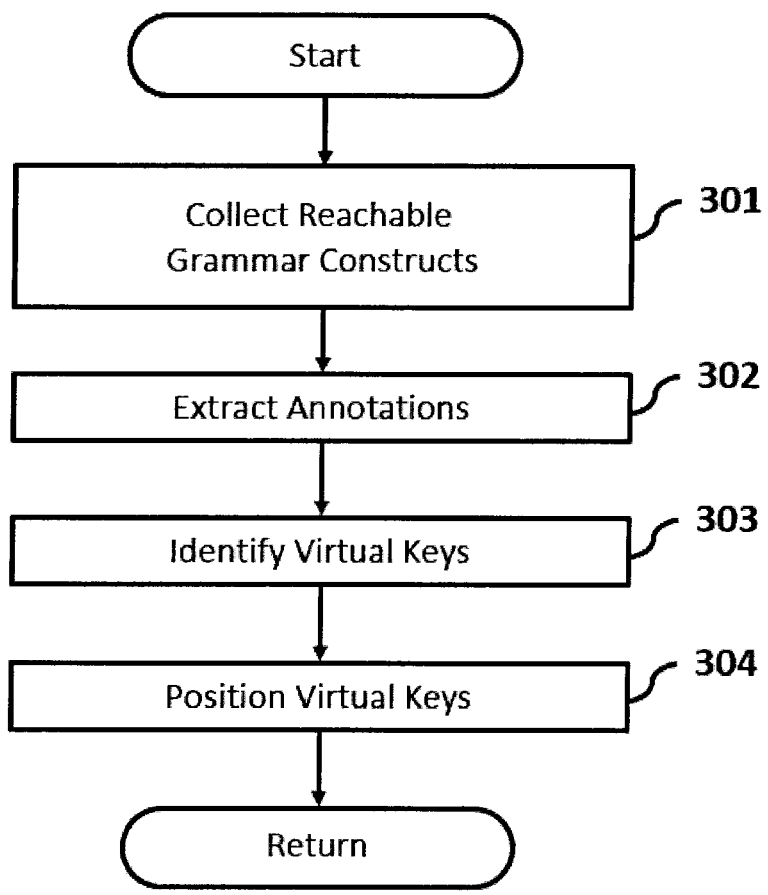
FIG. 5 is a flowchart of one embodiment of a method of computing a keyboard layout, in accordance with one or more aspects of the present invention.

The algorithmic details of how the device 10 computes an adaptive but partially stable keyboard layout are described below with reference to the exemplary embodiment of FIG. 5. As previously described, the first step 301 may include in parsing the input text and collecting the production rules allowed at the given input text location. At a minimum, the device 10 should ensure that annotations attached to production rules are captured as well.

In one embodiment, the device 10 may build a single list of all annotations specified on the previously identified production rules. In another embodiment, the device may choose to list the annotations specified not only on the identified production rules but also recursively on all reachable production rules. This is achieved in step 302, which comprises extracting the annotations from the specification of the restricted language.

At step 303, prior to modifying the virtual keyboard layout, the device 10 may build a ranked list of all the potential virtual keys based on the annotations found in step 302. In one embodiment, the device 10 may choose to keep the order in which the annotations have been found in the previous step. In another embodiment, the device 10 may leverage additional information stored on annotations (such as importance criteria) to create a list of the most relevant virtual keys to add. In a third embodiment, the device 10 may choose to rank annotations based on external information such as the history of the most recently used and/or the most frequently used abbreviations in a particular domain. At the end of step 303, the device 10 has a ranked list of virtual keys that may be added to the virtual keyboard. The key labels correspond to the abbreviations specified in the annotations.

Step 304 includes improving the keyboard layout by adding (and eventually removing) keys. Depending on what the user has to type in first, the device 10 may choose an initial keyboard layout that is the most suitable. For example, if a number is expected at the current text input location, the device 10 may choose a numeric keypad layout. If some plain English words are expected, the device 10 may pick one of the standard keyboard layout such as a QWERTY. For each predefined keyboard layout, the device 10 may have been configured to know the regions at which virtual keys can be added or replaced. For instance, on a number keypad, additional keys are often located around the digit keys. Once an initial keyboard layout has been chosen, the device 10 may start adding domain-specific virtual keys. In one embodiment, the device 10 may use as-is the ranked list computed at step 303 to identify which virtual key to add first.

Figure 6:
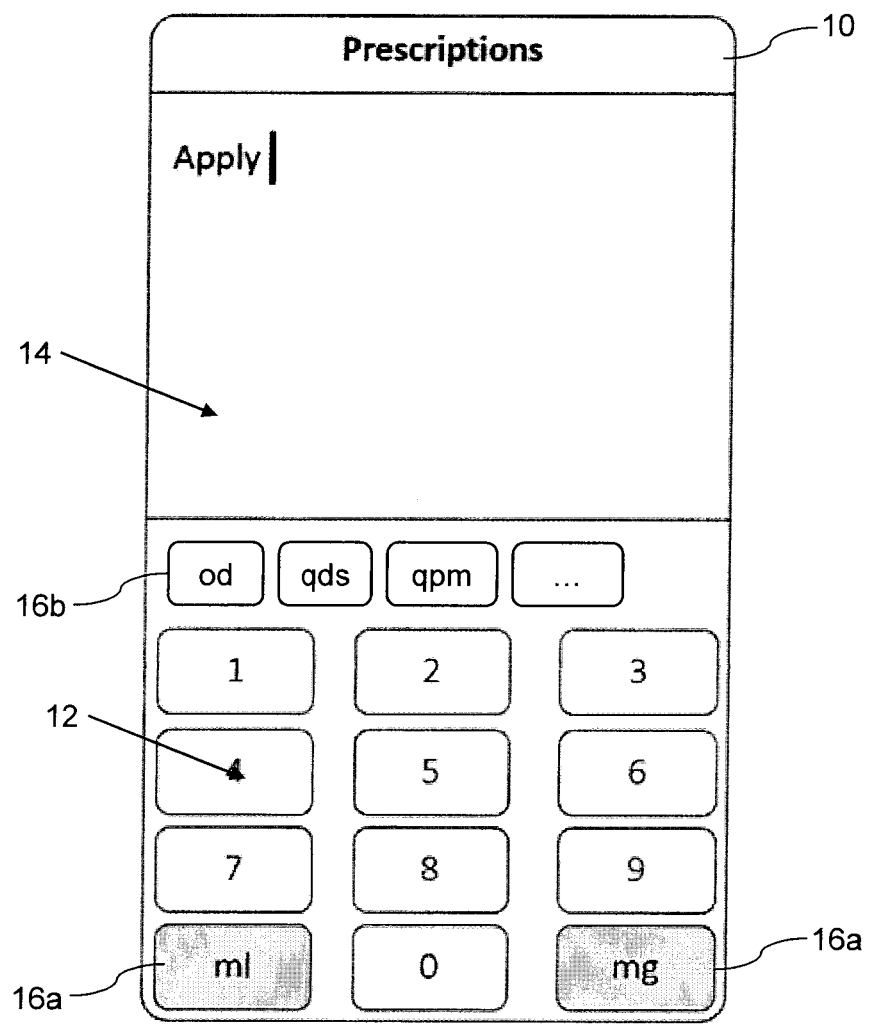
FIG. 6 is a further schematic diagram of one embodiment of a device, in accordance with one or more aspects of the present invention.

In another embodiment, the device 10 may decide to adjust the location, the size, or the shape of a virtual key according to its rank. For example, FIG. 6 shows a predominantly numeric keypad 12, with several virtual keys 16 ("ml" and "g" from the {unit} production rule and "od", "q.d.s.", and "q.p.m." from the {option} production rule. Virtual keys 16a corresponding to the {unit} production rule have been ranked higher than virtual keys 16b for the {option} production rule. Consequently, the "ml" and "mg" virtual keys have been added around the digit keys (reserving larger keys or buttons for these additional components) and the "od", "q.d.s.", and "q.p.m." keys have been listed on top of the keyboard 12. The following example shows annotated version of the production rules which includes an importance criteria (represented as a number):

```
<syntax>    => "Apply" <number> <unit> <options>? ;
<options>   => "once daily" {abbreviation("od", priority: 0) ;}|
            => "four times a day" {abbreviation("q.d.s.", priority: 1) ;}|
            => "every day after noon or every evening"
{abbreviation("q.p.m.", priority: 2) ;};
<unit>      => "mg" {abbreviation("mg", priority: 100) ;}|
            => "ml" {abbreviation("ml", priority: 100) ;};
```

Here, the annotations in the specification further define priorities for the additional keyboard components. The device 10, when redefining the keyboard layout to include the additional keyboard components, includes those additional keyboard components that have the highest priorities. For example, if there is only space for two new buttons in the keyboard layout, then the priorities defined in the annotations may drive the choice of which additional keyboard components are included in the redefined keyboard layout. Priorities can be refined over time, reflecting usage. The device 10 may detect the most used additional keyboard components and the redefining of the keyboard layout to include the additional keyboard components may therefore include those additional keyboard components that are the most used.

Figure 7:
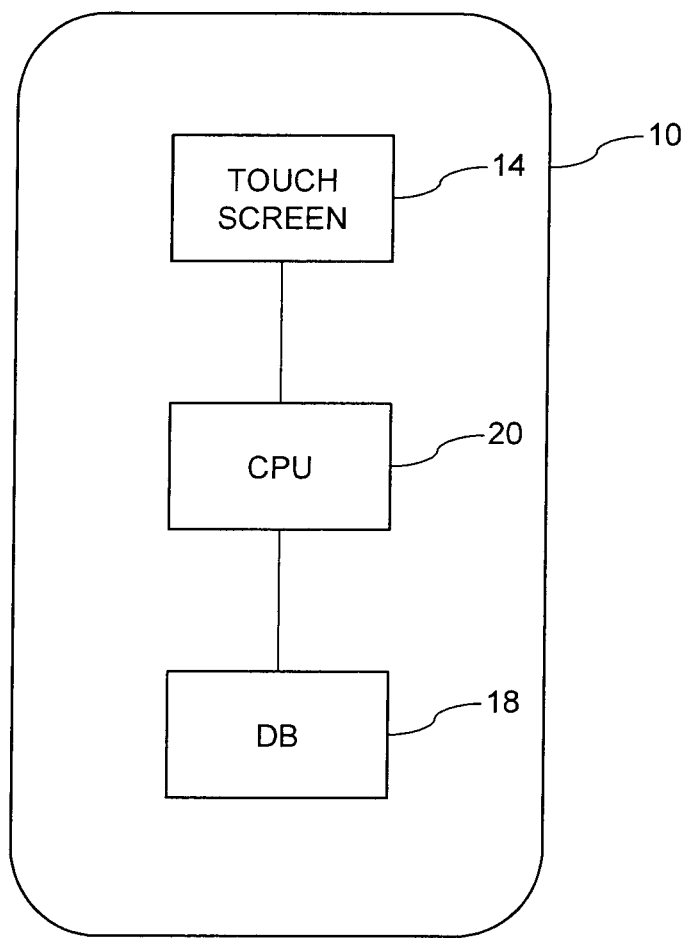
FIG. 7 is a schematic diagram of one embodiment of components of a device, in accordance with one or more aspects of the present invention.
Figure 7:
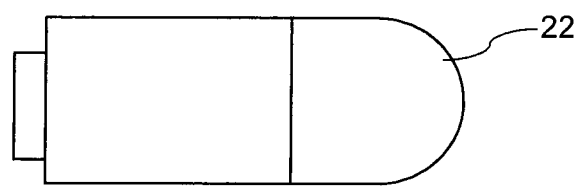

FIG. 7 shows some of the internal components of one or more embodiments of device 10. The device 10 comprises a touchscreen 14, a storage device 18 and a processor 20 connected to the touchscreen 14 and the storage device 18. The device 10 is a smartphone that has significant processing and display capabilities. The touchscreen 12 displays the "virtual" keyboard 12 that contains buttons that a user can "press" to type information into the device 10. For example, if the user accesses a messaging type application, they can type out a message on the virtual keyboard which will be displayed to the user as they type. The keyboard can be displayed in the lower half of the touchscreen 14, with the typed message appearing above the keyboard.

The processor 20 of device 10 can be controlled by a computer program product that is provided via a computer readable medium such as a CD-ROM. For example, the device 10 could be connected to a standard computer that has a CD-ROM drive that receives the CD-ROM, with the computer program product being provided to the device 10, which is a small portable smartphone, through the connected standard desktop computer. Other media could be used, such as a portable USB drive 22, as shown in FIG. 7, which contains the computer program product that can be provided to the device 10. The computer program product comprises a set of instructions that are executed by the processor 20 of the device 10.

Figure 8:
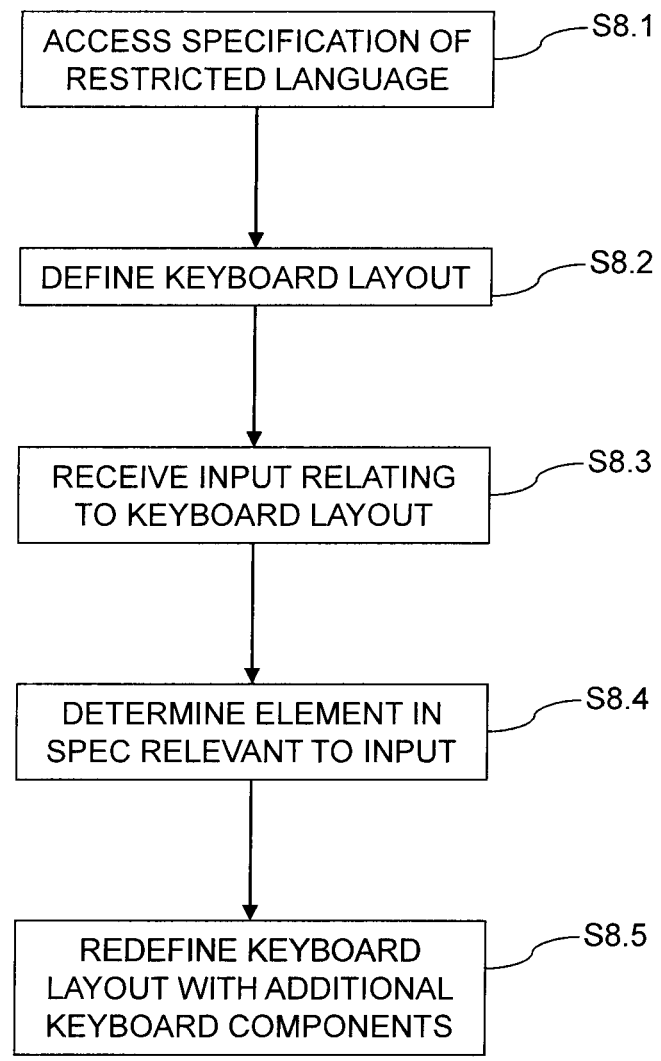
FIG. 8 is a flowchart of one embodiment of a method of operation of a processor of a device, in accordance with one or more aspects of the present invention.

FIG. 8 shows a flowchart of one embodiment of a method of operating the processor 20 of the device 10. The method comprises, at step S8.1, accessing a specification for a restricted language, the specification comprising a formal grammar and vocabulary for the restricted language and including annotations defining additional keyboard components in relation to specific elements within the grammar. At step S8.2, the processor 20 defines a keyboard layout and at step S8.3 receives an input relating to the defined keyboard layout. The input is assumed to have come from the keyboard, but could in fact have come from another source such as a dictation by the user, for example.

At step S8.4, the processor 20 determines a specific element within the grammar referred to by the received input, and at step S8.5 redefines the keyboard layout to include the additional keyboard components defined in the annotation for the determined specific element within the grammar. Once the device 10 receives an input, then the processor 20 will adapt the displayed keyboard according to the annotations within the specification that relate to the current semantic element being written by the user.

Aspects of the present invention may be embodied in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
   accessing a specification for a restricted language, the specification comprising rules specifying grammar and vocabulary for the restricted language, the rules including annotations for defining keyboard components in relation to specific elements within the grammar;
   defining a keyboard layout;
   receiving an input relating to the keyboard layout;
   determining a specific element, within the grammar, referred to by the received input;
   ascertaining, from the specification, a rule corresponding to the determined specific element, the rule including an annotation for defining an additional keyboard component for the keyboard layout, the annotation specifying an abbreviation for a related full element of the vocabulary;

redefining the keyboard layout to include the additional keyboard component displaying the abbreviation for the related full element; and based on receiving input that selects the additional keyboard component displaying the abbreviation, the additional keyboard component comprising a user-selectable virtual key of the keyboard layout, displaying the full element to which the abbreviation relates.

2. The method according to claim 1, wherein the annotations further define priorities for the additional keyboard components and the redefining of the keyboard layout includes the additional keyboard component based on the additional keyboard component being a highest priority additional keyboard component.

3. The method according to claim 1, further comprising detecting most used additional keyboard components, wherein the redefining of the keyboard layout includes the additional keyboard component based on the additional keyboard component being a most used additional keyboard component.

4. The method according to claim 1, wherein the redefining the keyboard layout to include the additional keyboard component comprises reserving a larger key within the keyboard layout for the additional keyboard component.

5. A device comprising:
a touchscreen to display a keyboard defined by a keyboard layout and to receive an input on the keyboard;
a storage device to store a specification for a restricted language, the specification comprising rules specifying grammar and vocabulary for the restricted language, the rules including annotations for defining keyboard components in relation to specific elements within the grammar; and
a processor connected to the touchscreen and the storage device, and configured to:
(i) define the keyboard layout,
(ii) determine a specific element within the grammar referred to by a received input,
(iii) ascertain, from the specification, a rule corresponding to the determined specific element, the rule including an annotation for defining an additional keyboard component for the keyboard layout, the annotation specifying an abbreviation for a related full element of the vocabulary,
(iv) redefine the keyboard layout to include the additional keyboard component displaying the abbreviation for the related full element, and
(v) based on receiving input that selects the additional keyboard component displaying abbreviation, the additional keyboard component comprising a user-selectable virtual key of the keyboard layout, display the full element to which the abbreviation relates.

6. The device according to claim 5, wherein the annotations further define priorities for the additional keyboard components and the processor, when redefining the keyboard layout includes the additional keyboard component based on the additional keyboard component being a highest priority additional keyboard component.

7. The device according to claim 5, wherein the processor is further programmed to detect the most used additional keyboard components, wherein the redefining of the keyboard layout includes the additional keyboard component based on the additional keyboard component being a most used additional keyboard component.

8. The device according to claim 5, wherein the processor is programmed, when redefining the keyboard layout to include the additional keyboard component, to reserve a larger key within the keyboard layout for the additional keyboard component.

9. A computer program product for controlling a processor, the computer program product comprising a computer readable storage medium having program instructions embodied therewith, the program instructions executable by the processor to cause the processor to:
access a specification for a restricted language, the specification comprising rules specifying grammar and vocabulary for the restricted language, the rules including annotations for defining keyboard components in relation to specific elements within the grammar;
define a keyboard layout;
receive an input relating to the keyboard layout;
determine a specific element within the grammar referred to by the received input;
ascertain, from the specification, a rule corresponding to the determined specific element, the rule including an annotation for defining an additional keyboard component for the keyboard layout, the annotation specifying an abbreviation for a related full element of the vocabulary;
redefine the keyboard layout to include the additional keyboard component displaying the abbreviation for the related full element; and
based on receiving input that selects the additional keyboard component displaying the abbreviation, the additional keyboard component comprising a user-selectable virtual key of the keyboard layout, display the full element to which the abbreviation relates.

10. The computer program product according to claim 9, wherein the annotations further define priorities for the additional keyboard components and the redefining of the keyboard layout includes the additional keyboard component based on the additional keyboard component being a highest priority additional keyboard component.

11. The computer program product according to claim 9, wherein the program instructions executable by the process are further to cause the processor to perform detecting most used additional keyboard components, wherein the redefining of the keyboard layout includes the additional keyboard component based on the additional keyboard component being a most used additional keyboard component.

12. The computer program product according to claim 9, wherein the redefining the keyboard layout to include the additional keyboard component comprises reserving a larger key within the keyboard layout for the additional keyboard component.

* * * * *